April 27, 1926.

J. R. STOWELL

LEVEL

Filed July 14, 1924

1,582,149

INVENTOR
JONATHAN ROBERT STOWELL
BY
Fetherstonhaugh & Co
ATTORNEYS

Patented Apr. 27, 1926.

1,582,149

UNITED STATES PATENT OFFICE.

JONATHAN ROBERT STOWELL, OF VANCOUVER, BRITISH COLUMBIA, CANADA.

LEVEL.

Application filed July 14, 1924. Serial No. 726,006.

*To all whom it may concern:*

Be it known that I, JONATHAN ROBERT STOWELL, a subject of the King of Great Britain, and a resident of the city of Vancouver, in the Province of British Columbia, Canada, have invented certain new and useful Improvements in Levels, of which the following is a specification.

My invention relates to improvements in levels the objects of which are to provide a leveling media for a vertical or horizontal level which is not subject to such displacement of the leveling media as to render the level inaccurate, a further object is to provide means whereby the level may be used to indicate horizontals, verticals, or inclinations as required without adjustment therefore, and a still further object is to provide means whereby a reading of the level may be accurately and conveniently taken in obscure positions.

The invention consists essentially of a straight edge having one or more circular apertures in which an annular transparent tube is fitted, such tube being half filled with spirit or other fluid, as will be more fully described in the following specification, in which:—

In the drawings like characters of reference indicate corresponding parts in each figure.

Figures 1, 2:
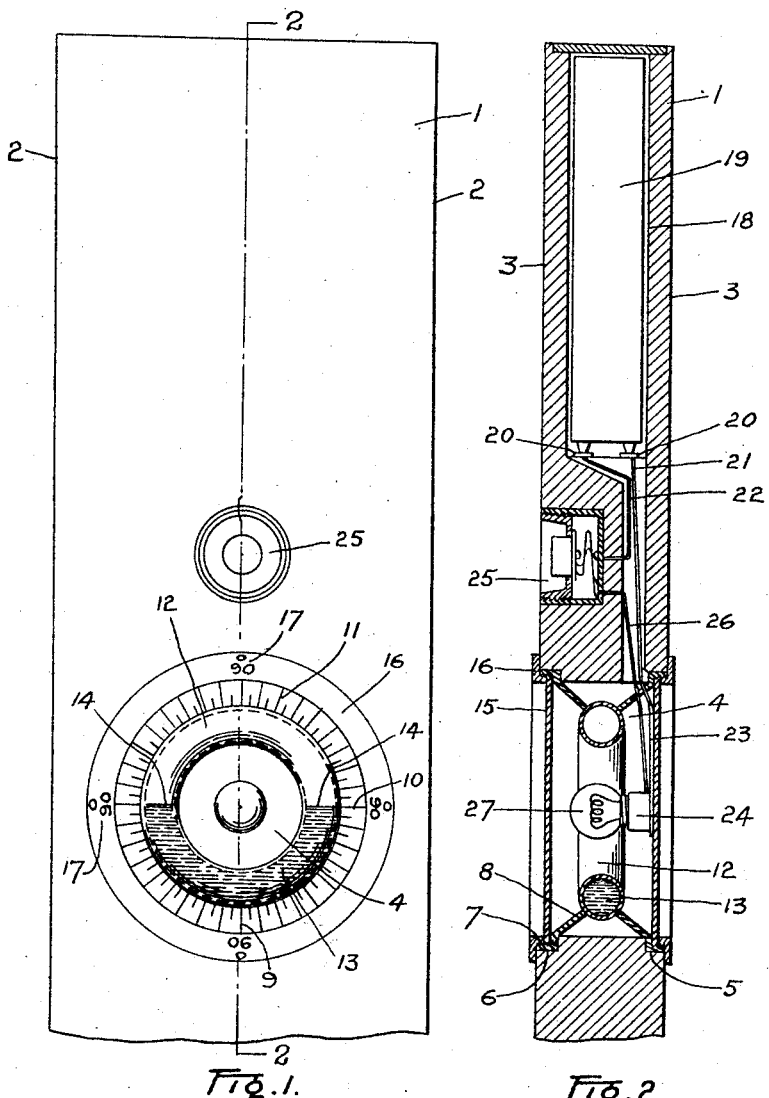
Fig. 1 is an enlarged fragmentary view of my invention.
Fig. 2 is an enlarged sectional view taken on the line 2—2 of Figure 1.
Figure 3:
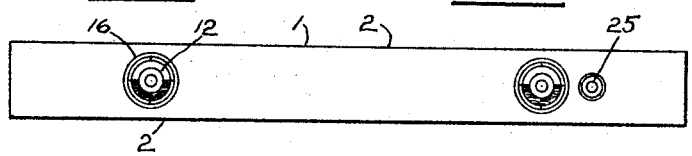
Fig. 3 is a general view of the level shown in horizontal position.

The numeral 1 indicates a straight edge having parallel sides and faces 2 and 3 respectively, through which one or more circular apertures 4 extend from one face 3 to the other, and which are recessed on both faces as at 5. Within each of the recesses 5 is disposed an annular ring 6 having a threaded recess 7 adjacent its face and a conical flange 8 which is marked off from a vertical and a horizontal index line 9 and 10, with graduations 11 to form a circular scale and which may be in degrees or otherwise to suit the requirements of the various trades in which the level is to be used. Supported between the inner peripheral edges of the flanges is a transparent annular tube 12 which is half filled with a coloured spirit or other fluid as indicated by the numeral 13, so that the graduations 11 indicated by the level 14 of spirit in the tube will represent the angle at which the level is held.

Disposed within the threaded recess 7 of the rings 6 is a disc of glass or other transparent material 15 through which the leveling tube 12 is viewed, it also prevents the graduations from becoming obscure through dust or handling. The glasses 15 are held in place by a threaded ring 16 which may be marked with numerals 17 indicative of the graduations 11.

For situations where the light is insufficient for proper reading of the level, I provide a recess 18 adjacent one of the apertures 4 into which a small dry cell 19 is placed and at the base of the recess suitable contacts 20 are disposed and are connected to a pair of conductors 21 and 22 respectively, one of which connects directly to a strip of metal 23 extending to the centre of one of the glass discs 15 and forming a base for a lamp socket 24. The wire 22 leads to a push button switch 25 from which a further wire 26 is lead to the socket 24 to complete a circuit from the battery 19 to the lamp bulb 27.

Having thus described the several parts of my invention I will now briefly explain its use.

When it is desired to obtain a horizontal reading the level is placed on one of its sides 2 and is adjusted until the level 14 of the spirit 13 is in line with the vertical line 9, and similarly if a vertical is to be obtained a side 2 is placed alongside the work and a reading taken with the fluid level 14 coinciding with the horizontal line 10.

If an angle is desired such as is required for building a battered buttress, the angle is determined in a similar manner to those previously described and the readings taken with the level of fluid in one column of the tube 13 reading to the desired graduation above the line 10 and the corresponding level reading below the line 10.

In the event of expansion taking place in the fluid so that the tube is more than one half filled, the reading will be taken on corresponding graduations above the medial line of the tube.

It will thus be seen that I have invented a level in which the leveling gauge, in which columns of fluid are so disposed and connected, that the surface level of both is at all times equal and that readings are taken on graduations adjacent such fluid surface levels.

What I claim as my invention is:

A level comprising a straight edge member provided with a circular aperture extending therethrough, said aperture being widened at each end to form an internal outwardly facing annular ledge, a pair of conical annular members arranged within the opening with the inner smaller edges of said members approaching one another at approximately the longitudinal center of the opening, the outer edges of said members being shaped to provide portions flatly engaging the aforesaid ledges and terminating in oppositely directed annular flanges extending longitudinally of the opening and engaging the circumferential wall of the opening outwardly of said ledges said flanges being internally threaded, an annular leveling tube containing a suitable fluid and supported by and between the inner ends of said conical members, transparent closure members applied to the ledge engaging portions of said conical members, and retaining rings threadedly engaged with the aforesaid flanges of the conical members and serving to hold the transparent covers in place.

Dated at Vancouver, B. C., this 20th day of June, 1924.

JONATHAN ROBERT STOWELL.